A. BRIGHTMAN.
Milk Can Cover.

No. 44,848. Patented Nov. 1, 1864.

UNITED STATES PATENT OFFICE.

ALBERT BRIGHTMAN, OF NEW BEDFORD, MASSACHUSETTS.

IMPROVED COVER FOR MILK-CANS.

Specification forming part of Letters Patent No. 44,848, dated November 1, 1864.

*To all whom it may concern:*

Be it known that I, ALBERT BRIGHTMAN, of New Bedford, in the county of Bristol and State of Massachusetts, have invented an Improvement in Milk-Can Covers; and I do hereby declare that the following, taken in connection with the drawings which accompany and form part of this specification, is a description of my invention sufficient to enable those skilled in the art to practice it.

This invention has for its object the better preservation of milk in a sweet or unchanged condition in milk-cans for transportation than is obtained in the common construction of such cans, this being effected by a peculiar construction given to the top or cover of the can for ventilation, in which peculiar construction my invention consists.

Figure 2:
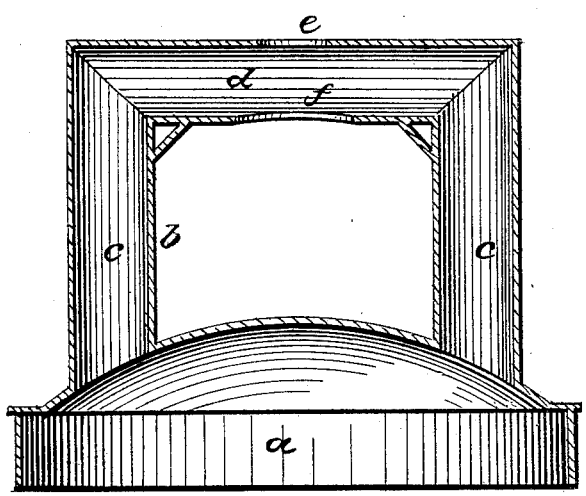
Figure 1:
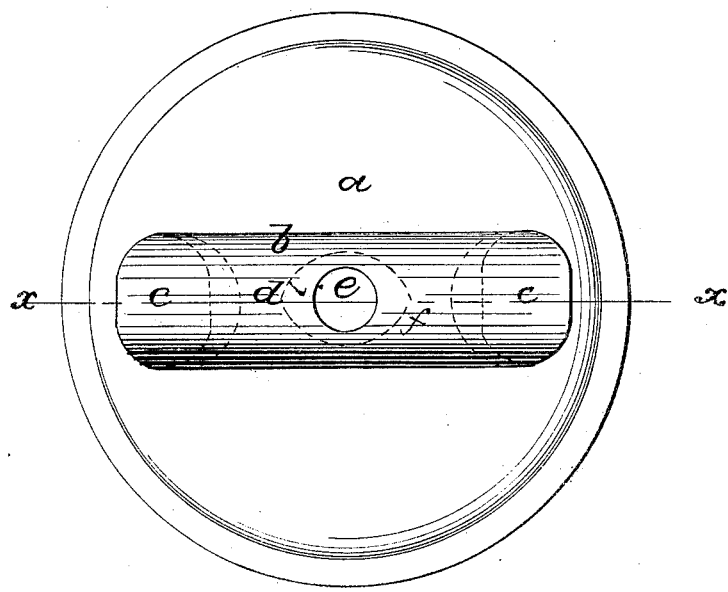

Figure 1 shows a plan of a milk-can cover embodying this improvement. Fig. 2 is a section of the same on the line $x\ x$ of Fig. 1.

$a$ denotes the cover made to be confined upon the can in the usual manner. $b$ is the handle to the same. The uprights $c\ c$ of the handle are made hollow or tubular and are so applied to the cover as to open into the same or into the can when the cover is in position thereon. The cross-piece $d$ is also of a tubular construction, its opposite ends opening into the upper ends of the hollow upright $c$. The top part of the tube $d$ has an aperture, $e$, and the bottom part directly under the opening $e$ has an opening, $f$, of larger size. It will be readily understood that when a can of milk is covered by this cap or top piece, a free egress is left for the escape of whatever gases may be evolved by any change of temperature or by agitation of the milk. It will be also obvious that this ventilation serves to preserve the milk sweet and in good condition, preventing deleterious change therein from confinement, agitation, or increase or sudden change of temperature. The lower opening, $f$, is made in the handle and directly under and larger than the opening $e$, in order that any dust or dirt entering the opening $e$ may not lodge in the tubular handle and be carried into the can, but may drop directly through the handle, lodging upon the top of the can or being blown away. Wire-gauze may cover these openings if necessary.

This improvement is of course applicable to other vessels than milk-cans where it is desirable to ventilate the contents or to leave the vessel open for free egress of gases evolved therein. Its construction may be modified; but that shown and described is preferred.

It will be observed that by carrying the tubes $c$ up from the top of the cover and ventilating through them and the cross-piece $d$, instead of making a ventilating-hole to open directly out from the top of the can, liability of the milk to spill out from the can by jarring or tipping the same is avoided.

I claim—

A tubular ventilating-handle for a milk or other can, constructed and operating substantially as set forth.

ALBERT BRIGHTMAN.

Witnesses:
CHAS. J. RANDALL,
J. B. WATKINS.